Aug. 8, 1950
G. S. McINTYRE
2,517,798
WELDING ELECTRODE ASSEMBLY
Filed May 31, 1949
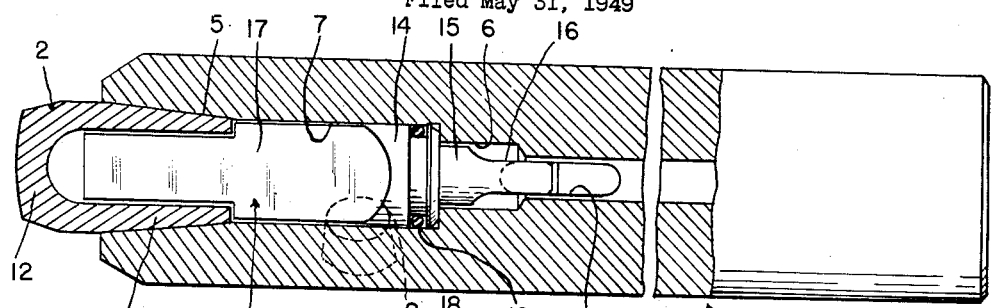
FIG.1.
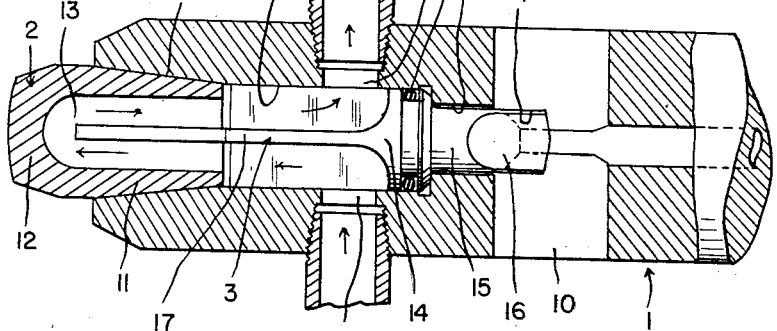
FIG.3.
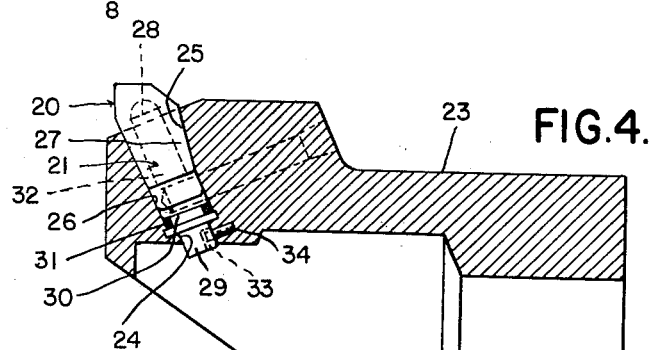
FIG.4.
FIG.2.
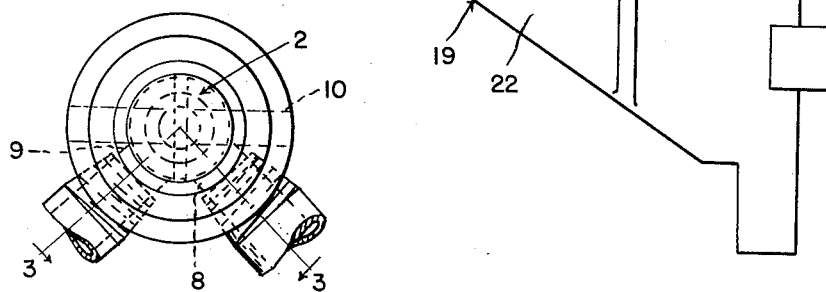
INVENTOR.
GLENN S. McINTYRE
BY
ATTORNEYS

UNITED STATES PATENT OFFICE 2,517,798

WELDING ELECTRODE ASSEMBLY

Glenn S. McIntyre, Lansing, Mich., assignor to Kelsey-Hayes Wheel Company, Detroit, Mich., a corporation of Delaware Application May 31, 1949, Serial No. 96,275

4 Claims. (Cl. 219—4)

The invention relates to welding electrode assemblies and refers more particularly to welding electrode assemblies of that type adapted to be cooled by a cooling medium.

The invention has for one of its objects to provide an improved welding electrode assembly constructed to have its welding tip effectively cooled by the flow of a cooling medium.

The invention has for another object to so construct the parts of the welding electrode assembly that they may be economically manufactured and assembled and disassembled.

With these and other objects in view the invention resides in the novel features of construction and combinations and arrangements of parts as more fully hereinafter set forth.

In the drawings:

Figure 1 is a side elevation partly broken away and in section of a welding electrode assembly embodying the invention;

Figure 2 is an end view thereof;

Figure 3 is a cross section mainly on the line 3—3 of Figure 2;

Figure 4 is a view similar to Figure 1 showing a modification.

The welding electrode assembly comprises the holder 1, the welding tip 2 and the flow directing member 3 for cooperating with the holder and tip to direct the flow of a suitable medium, such as a fluid and more particularly water, for cooling the welding electrode and more particularly the tip during operation.

The holder 1 is a cylindrical body formed at one end with an axially extending recess having at its inner end the polygonal portion 4, at its outer end the frusto-conical flared portion 5 and between these portions the cylindrical portion 6 connecting into the polygonal portion 4 and the cylindrical portion 7 connecting into the frusto-conical portion 5 and the cylindrical portion 6, the cylindrical portion 7 being of greater diameter than the cylindrical portion 6. The body is also formed with the inlet and outlet openings 8 and 9 communicating with the cylindrical portion 7 and extending angularly relative to each other. Suitable conduits are connected to these openings for the passage of a cooling medium, such as water, to and from the cylindrical portion 7. The body is also provided with the transverse opening 10 therethrough which intersects the polygonal portion 4 which as shown has a rectangular transverse section, the longitudinal median plane of the transverse opening coinciding with the longitudinal median plane of the polygonal portion.

The welding tip 2 is formed with the frusto-conical tapered side wall 11 and the solid outer end wall 12, the inclination of the outer surface of the side wall being substantially the same as that of the frusto-conical flared portion 5 of the holder recess and such that the tip when inserted into the holder normally remains in engagement therewith. The welding tip is hollow by reason of being formed with the substantially axially extending recess 13 which is of smaller diameter than and opens at its inner end into the cylindrical portion 7 of the holder recess.

The flow directing member 3 is insertable into and removable from the holder and is formed with the cylindrical head 14 from one side of which extends a shank having the cylindrical portion 15 and the polygonal portion 16 and from the other side of which extends the partition or wall 17. The head 14 slidably fits the cylindrical portion 7 of the recess while the portions 15 and 16 of the shank extend within the cylindrical and polygonal portions 6 and 4 respectively of the recess. The partition or wall 17 extends diametrically across the cylindrical portion 7 of the holder recess and also the recess 13 of the welding tip and between the inlet and outlet openings 8 and 9, the head 14 being located axially inwardly in the cylindrical portion 7 with respect to these openings. The outer end of the partition or wall 17 terminates short of and is spaced from the solid outer end wall 12 of the welding tip so that as a result the partition or wall serves to cooperate with the holder and the welding tip to form a U-shaped passage for the cooling medium entering the inlet opening and passing out of the outlet opening, this cooling medium having an extended area of contact with the welding tip and flowing across its outer end wall. 18 is a sealing ring located in an annular groove in the head 14 and engaging the adjacent portion of the wall of the cylindrical portion 7 of the holder recess.

With the above construction it will be seen that the welding electrode assembly parts may be readily formed and assembled and when assembled provide for the efficient cooling of the welding electrode assembly and more particularly the welding tip. It will also be seen that the flow directing member is predeterminedly angularly located with respect to the holder so that its partition or wall extends between the inlet and outlet openings, the locating being determined by the polygonal shank portion of the flow directing member substantially fitting the polygonal recess portion of the holder. Furthermore, it will be seen that the parts may be readily disassembled by employing a key insertable into the opening 10 of the holder 1 to remove the insert 3 and if necessary the welding tip 2 by the insert.

As shown in Figure 4, the welding electrode assembly comprises the holder 19, the welding tip 20 and the flow directing member 21. The holder is an inverted U-shaped body in cross section having the side walls 22 and the top wall 23. The top wall at its outer end is formed with a transverse recess which as shown is open at both its upper and lower ends and has the cylindrical lower end portion 24, the frusto-conical flared upper end portion 25 and the intermediate cylindrical portion 26 connecting into the cylindrical portion 24 and the frusto-conical portion 25 and of greater diameter than the cylindrical portion 24. The top wall is also formed with the inlet and outlet openings communicating with the upper part of the cylindrical portion 26 and extending angularly relative to each other in the same manner as the inlet and outlet openings 8 and 9.

The welding tip 20 is formed with the frusto-conical tapered side wall 27 and the solid outer end wall 28, the inclination of the outer surface of the side wall being such that the tip when inserted into the holder normally remains in engagement therewith. This tip is also hollow and its interior communicates with the upper part of the cylindrical portion 26 of the holder recess. The flow directing member 21 is also insertable into and removable from the holder and has at its lower end the shank 29 engageable in the cylindrical recess portion 24 and extending below the lower surface of the top wall 23. This member also has the head 30 located within the lower part of the cylindrical recess portion 26 and provided with a sealing ring 31. The member is also formed with the partition or wall 32 extending from the side of the head 30 opposite the shank 29 and extending diametrically across the cylindrical recess portion 26 and the interior of the welding tip and between the inlet and outlet openings. The upper end of the partition or wall terminates short of the outer end wall of the welding tip so that a U-shaped passage for the cooling fluid is provided between the inlet opening and outlet opening. To angularly position the flow directing member with respect to the holder so that the partition or wall 32 is properly located to extend between the inlet and outlet openings, the shank 29 is formed with the longitudinally extending groove 33 for receiving the outer end of the pin 34 extending within and fastened to the top wall 23.

What I claim as my invention is:

1. A welding electrode assembly comprising a holder having a recess and inlet and outlet openings communicating with the recess for the passage of a cooling medium to and from the recess, a detachable tip extending within the recess of said holder in electrical contact with said holder and having a solid outer end wall and a recess communicating with the recess of said holder and a detachable insert having a partition within and extending substantially diametrically across the recess of said holder between said inlet and outlet openings and also within and extending across the recess of said tip, said partition having its outer end spaced from said outer end wall whereby said insert forms with said holder and tip a U-shaped passage for the cooling medium from the inlet opening to the outlet opening.

2. A welding electrode assembly comprising a holder formed with a recess and having inlet and outlet openings communicating with the recess for the passage of a cooling medium to and from the recess, a detachable tip extending within the recess in electrical contact with said holder and having a recess communicating with the holder recess and a solid outer end wall and a member having a partition extending substantially diametrically within and extending across the holder recess between the inlet and outlet openings and within and across the tip recess and having its outer end spaced from said solid outer end wall, said holder, tip and member cooperating to form a passage for the cooling medium from the inlet opening to the outlet opening.

3. A welding electrode assembly comprising a holder having a substantially axially extending recess formed with a polygonal portion, an opening extending transversely of and intersecting the polygonal portion of the recess and inlet and outlet openings communicating with the recess at a distance spaced longitudinally of said holder from the transverse opening, a detachable member extending within the recess and having a polygonal portion extending within the polygonal portion of the recess, a head between the polgonal portion of the recess and the inlet and outlet openings and a partition extending substantially diametrically within the recess and thereacross between the inlet and outlet openings, sealing means between said head and the adjacent portion of said holder and a detachable tip extending within the recess of said holder and in electrical contact with said holder, said tip having a recess in communication with the recess of said holder and receiving said partition, the outer end of said partition being axially spaced from the outer end portion of said tip.

4. A welding electrode assembly comprising a cylinder having a recess and inlet and outlet openings communicating with the recess, a detachable member extending within the recess and having a shank, a head and a partition at the side of said head opposite said shank and extending substantially diametrically within the recess and thereacross between the inlet and outlet openings, means on said holder and shank for predeterminedly angularly positioning said detachable member relative to said holder, sealing means between said head and the adjacent portion of said holder and a detachable tip extending within the recess of said holder and in electrical contact with said holder, said tip having a recess in communication with the recess of said holder and receiving said partition, the outer end of said partition being axially spaced from the outer end portion of said tip.

GLENN S. McINTYRE.

REFERENCES CITED

The following references are of record in the file of this patent:

UNITED STATES PATENTS

| Number | Name | Date |
| --- | --- | --- |
| 1,058,677 | Taylor | Apr. 8, 1913 |
| 1,607,710 | Von Henke | Nov. 23, 1926 |